United States Patent
Camuti

(10) Patent No.: US 10,799,026 B2
(45) Date of Patent: Oct. 13, 2020

(54) SYSTEMS AND METHODS FOR ARRANGING SEATS IN A SEATING AREA

(71) Applicant: Steven Camuti, San Francisco, CA (US)

(72) Inventor: Steven Camuti, San Francisco, CA (US)

(*) Notice: Subject to any disclaimer, the term of this patent is extended or adjusted under 35 U.S.C. 154(b) by 0 days.

(21) Appl. No.: 15/928,050

(22) Filed: Mar. 21, 2018

(65) Prior Publication Data
US 2019/0111806 A1 Apr. 18, 2019

Related U.S. Application Data

(60) Provisional application No. 62/474,267, filed on Mar. 21, 2017.

(51) Int. Cl.
| | |
|---|---|
| *G05B 19/02* | (2006.01) |
| *G05B 19/402* | (2006.01) |
| *A47C 1/00* | (2006.01) |
| *A47C 1/12* | (2006.01) |
| *B60N 2/02* | (2006.01) |
| *B60N 2/01* | (2006.01) |
| *B60N 2/00* | (2006.01) |
| *B64D 11/06* | (2006.01) |
| *A47C 1/032* | (2006.01) |

(52) U.S. Cl.
CPC .............. *A47C 1/12* (2013.01); *A47C 1/00* (2013.01); *A47C 1/03294* (2013.01); *B60N 2/002* (2013.01); *B60N 2/01* (2013.01); *B60N 2/0244* (2013.01); *B64D 11/0601* (2014.12); *B64D 11/0602* (2014.12); *G05B 19/02* (2013.01); *G05B 19/402* (2013.01); *B60N 2002/0264* (2013.01); *B60N 2002/0268* (2013.01); *G05B 2219/23193* (2013.01)

(58) Field of Classification Search
CPC ..... A47C 1/03294; A47C 3/0257; A47C 1/00; A47C 1/12; B60N 2/01; B64D 11/0602; B64D 11/0601; A47B 83/023; A47B 83/001
USPC ................................................ 297/184.14
See application file for complete search history.

(56) References Cited

U.S. PATENT DOCUMENTS

| | | | | | |
|---|---|---|---|---|---|
| 5,979,604 | A | * | 11/1999 | Pinna | G07G 1/0036 186/39 |
| 9,955,318 | B1 | * | 4/2018 | Scheper | G06Q 10/063114 |
| 2002/0149239 | A1 | * | 10/2002 | Koljonen | A47C 7/72 297/184.14 |

(Continued)

FOREIGN PATENT DOCUMENTS

JP 6387877 B2 * 9/2018 ............... G06T 1/00

*Primary Examiner* — Thomas Randazzo
(74) *Attorney, Agent, or Firm* — Camuti Law Group, APC; Nathan Camuti

(57) ABSTRACT

There is provided a system comprising a plurality of movable seats arranged in a seating area, a detection device, a non-transitory memory storing an executable code, a hardware processor executing the executable code to receive a first input from the detection device indicating an individual is present in the seating area, determine a first position of the individual in the seating area at a first time based on the first input, and arrange the plurality of seats in a first configuration based on the first position of the individual, wherein arranging the plurality of seats includes moving at least one of the plurality of seats to a new position.

14 Claims, 7 Drawing Sheets

(56) References Cited

U.S. PATENT DOCUMENTS

| | | | | |
|---|---|---|---|---|
| 2008/0164736 A1* | 7/2008 | Figueras Mitjans | ...... | E04H 3/30 297/257 |
| 2014/0306061 A1* | 10/2014 | Schomacker | ........ | B60N 2/3065 244/118.6 |
| 2014/0358639 A1* | 12/2014 | Takemoto | .......... | G06K 9/00335 705/7.33 |
| 2014/0363043 A1* | 12/2014 | Bernal | ............... | G06K 9/00771 382/103 |
| 2015/0012307 A1* | 1/2015 | Moss | ..................... | G06Q 10/02 705/5 |
| 2015/0120340 A1* | 4/2015 | Cheatham, III | ....... | G06Q 10/02 705/5 |
| 2015/0227969 A1* | 8/2015 | Hanly | ................ | G06Q 30/0252 705/14.5 |
| 2016/0221191 A1* | 8/2016 | Ota | ........................ | B25J 9/1674 |
| 2019/0258218 A1* | 8/2019 | Gassner | ............... | G05B 19/402 |

* cited by examiner

SYSTEMS AND METHODS FOR ARRANGING SEATS IN A SEATING AREA

RELATED APPLICATION(S)

The present application claims the benefit of and priority to a U.S. Provisional Patent Application Ser. No. 62/474,267, filed Mar. 21, 2017, which is hereby incorporated by reference in its entirety into the present application.

SUMMARY

The present disclosure is directed to systems and methods for arranging seats in a seating area, substantially as shown in and/or described in connection with at least one of the figures, as set forth more completely in the claims.

DETAILED DESCRIPTION

Figure 1:
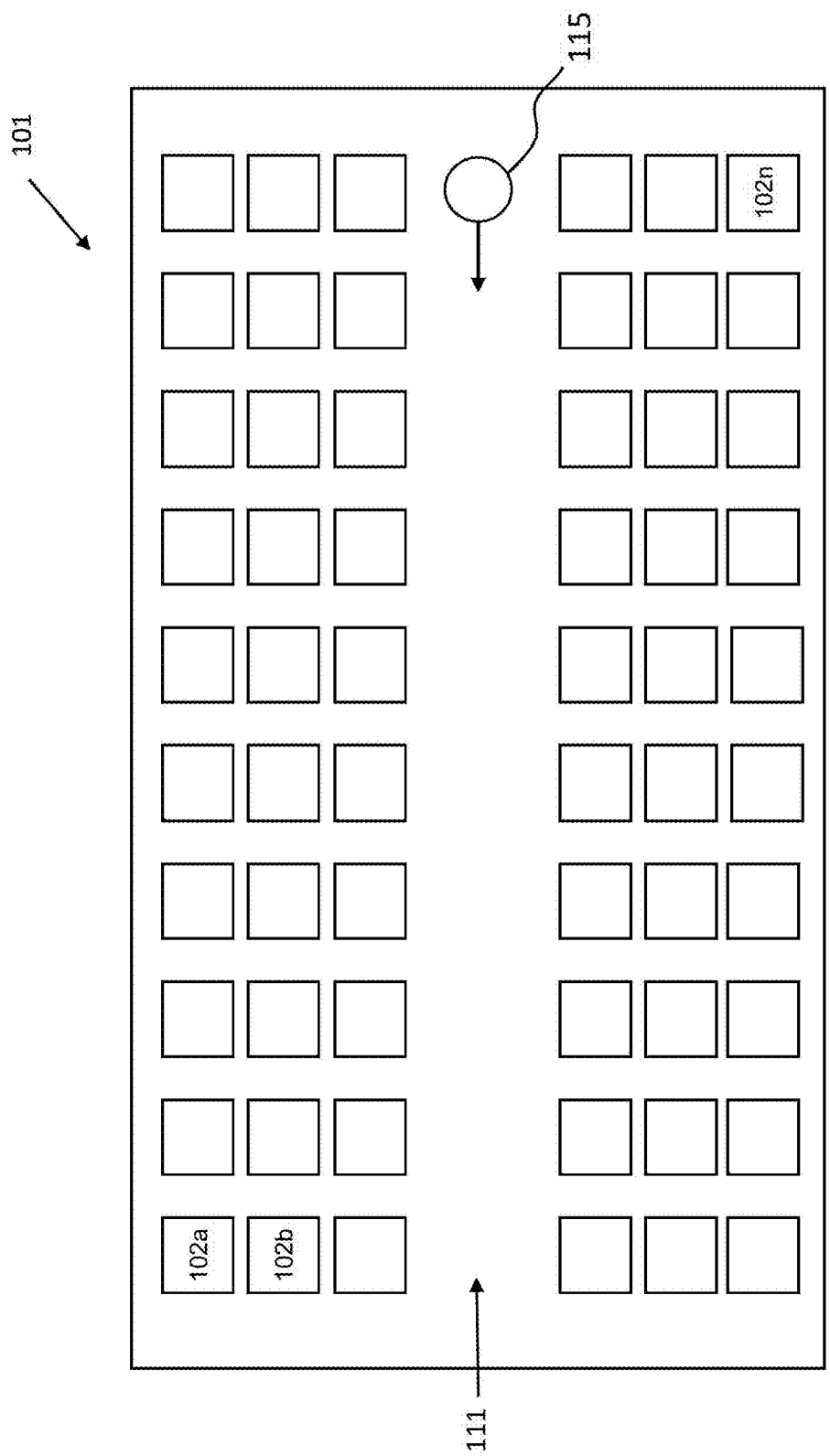
FIG. 1 shows a diagram of a fixed-seat seating area of the prior art.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Currently, many seating areas for seating groups including multiple individuals comprised by a plurality of seats in an arrangement with the seats fixed in place. For example, vehicles used for travel include a passenger seating area with a fixed seating arrangement. The fixed seating arrangement typically includes an aisle for allowing individuals in the seating area to move between the front of the seating area and the rear of the seating area. Individuals may use the aisle to enter the seating area and find an unoccupied seat, move from a seat to a facility, such as a bathroom, distribute refreshments, such as food or beverages to other individuals in the seating area, etc. However, a fixed aisle may take up space that could be used to provide room for seated passengers, thus increasing the comfort of individuals in the seating area.

FIG. 1 shows a diagram of conventional passenger cabin 100. Conventional passenger cabin 100 may include a plurality of seats, such as seat 102a, seat 102b, . . . , seat 102n, where "n" is an index indicating the total seats in conventional passenger cabin 100, positioned within conventional passenger cabin 100. In some implementations, conventional passenger cabin 100 may include one or more aisles, such as aisle 111. Aisle 111 may have a width, each seat 102a-102n may have a width. In some implementations, there may be a plurality of seat gaps, where each seat gap may be the space between the seats in convention passenger cabin 100. Each seat, gap may have a width, such as a one (1) inch gap, a two (2) inch gap, etc. In some implementations, there may be a wall gap between an inner wall of conventional passenger cabin 100 and the seats positioned closest to the inner wall of conventional passenger cabin 100 such that there are two wall gaps, a first wall gap and a second wall gap, one on either side of conventional passenger cabin 100. In some implementations, the sum of the first wall gap, the second wall gap, the plurality of seat gaps, the width of the one or more aisles, and the widths of the plurality of seats in a row equals the inner width of conventional passenger cabin 100. Individual 115 may be an occupant of conventional passenger cabin 100.

In some implementations, each seat in conventional passenger cabin 100 may be fixedly attached to a floor of conventional passenger cabin 100. The seats may be fixedly attached using a plurality of nuts and bolts, screws, and/or other fasteners appropriate for securing seats to the floor of conventional passenger cabin 100. Accordingly, the aisle of conventional passenger cabin 100 may not be used for a substantial portion of the time that conventional passenger cabin 100 is occupied by one or more individuals, such as individual 115. For example, the aisle is not in use when everyone in conventional passenger cabin 100 is seated, and is only minimally used when a small number of individuals use the aisle, e.g., to go to the restroom or deliver refreshments. The aisle is substantially in use during the beginning and end of the time the seating area is used, such as during boarding of a plane or train, or at the beginning, intermission, and end of a live performance.

Figure 2:
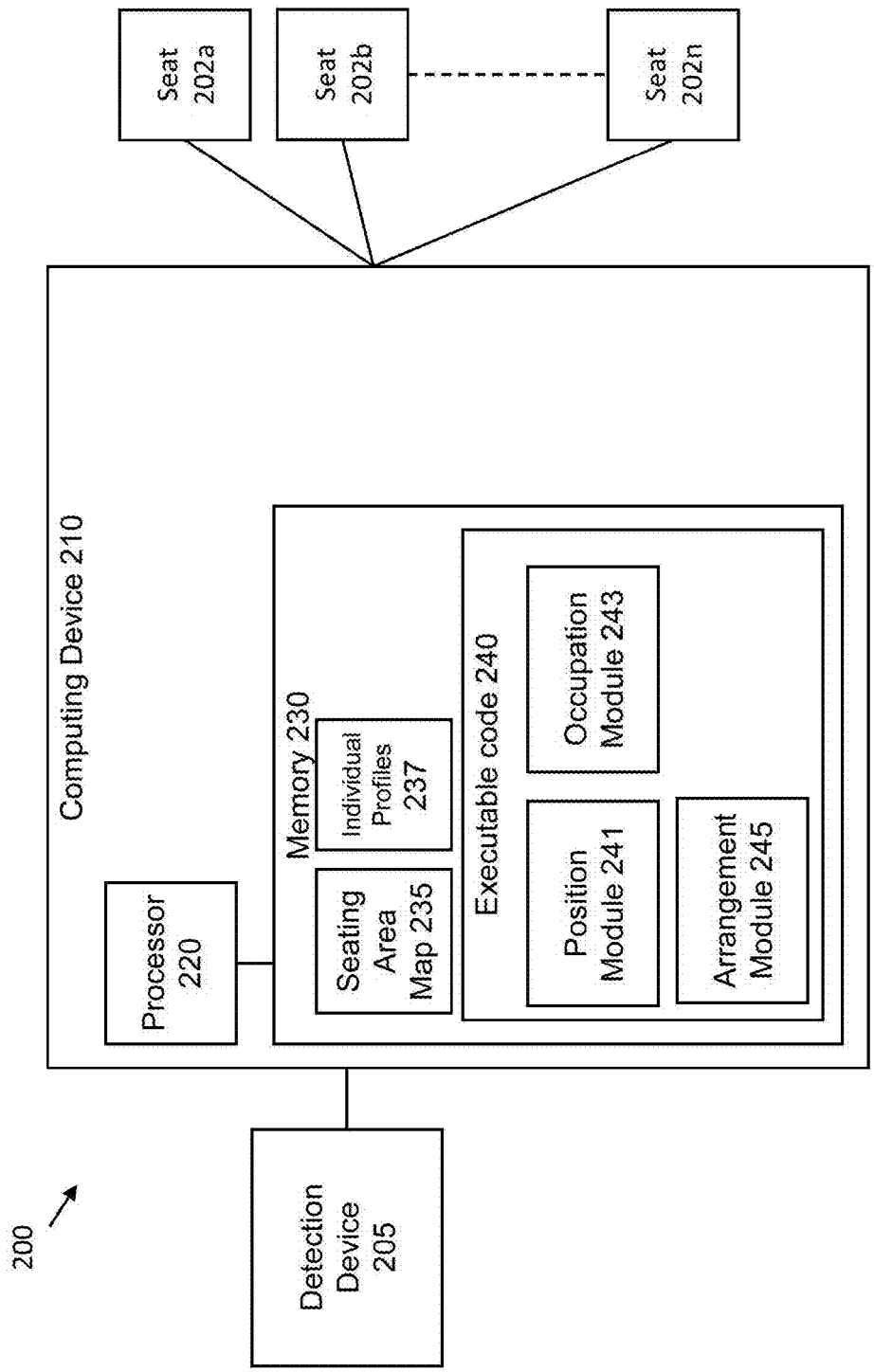
FIG. 2 shows a diagram of an exemplary system for arranging seats in a seating area, according to one implementation of the present disclosure.

FIG. 2 shows a diagram of an exemplary system for arranging seats in a seating area. System 201 includes detection device 205, computing device 210, and a plurality of seats 202a, 202b, . . . 202n. In some implementations, seats 202a, 202b, 202n may be moveable seats such that each seat may have a position in a seating area and may be moved to one or more other positions in the seating area. Detection device 205 may be a device for detecting, identifying, and/or tracking positions of one or more individuals.

In some implementations, detection device 205 may be a visual device for detecting, identifying, and/or tracking the position of an individual, e.g., a visible light camera, an infrared light camera, etc. In other implementations, detection device 205 may be a device for receiving a signal for locating and/or tracking the individual, such as a wireless communication sensor, e.g., an RFID transceiver, a Bluetooth receiver, a Bluetooth Low Energy (BLE) receiver, one or more microphones, etc. In other implementations, detection device 205 may include a light radar (LIDAR) system, a light-beam sensor, such as a trip-wire style detection system utilizing, for example, infrared light beams. In some implementations, detection device 205 may utilize near field communication (NFC) detection, active and/or passive radio frequency identification, Doppler tacking, physical detection, such as weight detection in a floor of the passenger cabin, proximity detection, such as electromagnetic and/or inductive proximity detection, a dielectric sensor, etc. Detection device 205 may include passive detection, such as buttons installed on seats in the seating area, pull cords, reed switches, touch switches, etc.

In one implementation, detection device 205 may detect individuals based on mobile phones, tablet computers, or other personal communication devices. Each individual may have a mobile phone or other personal computing device, and the presence, position, location, motion, etc., of each individual may be tracked using that device. For example, a personal computing device may be identified, located, and/or tracked using a cellular signal, a wireless signal, such as Wi-Fi, Bluetooth (BT), Bluetooth Low Energy (BLE), near field communication (NFC) technology, etc.

Computing device 210 may be a computing device for arranging seats in a seating area based on the location, position, and/or motion of one or more individuals in an area. As shown in FIG. 2, computing device 210 includes processor 220 and memory 230. Processor 220 is a hardware processor, such as a central processing unit (CPU) found in computing devices. Memory 230 is a non-transitory storage device for storing computer code for execution by processor 220, and for storing various data and parameters. As shown in FIG. 2, memory 230 includes area map 235, individual profiles 237, and executable code 240. Area map 235 may be a map of an area including a plurality of seats, such as the passenger cabin of a bus, the passenger cabin of a train, the passenger cabin of an airplane, etc. In some implementations, area map 235 may be a map of a seating area, such as a theater, an amphitheater, an arena, etc. Area map 235 may include the layout and dimensions of the area and the arrangement of a plurality of seats therein. In some implementations, area map 235 may be a dynamic map that may be updated with changing positions of one or more elements of an area represented by area map 235.

Individual profiles 237 may include a profile for one or more individuals. In some implementations, each profile of individual profiles 237 may correspond to an individual to be seated in one of seats 202*a*, 202*b*, etc. Each individual profile may include parameters, such as a preferred distance from nearby seats, a desired grouping of seats, one or more individual details, such as a height of the individual, a weight of the individual, and/or other details about an individual that may be used to make the individual's travel experience more comfortable. For example, the height and/or length of an individual's legs may be used to determine how much leg room that individual may need to be most comfortable. Individual profiles 237 may include grouping details of one or more individuals. For example, individual profiles 237 may indicate that two or more individuals are part of a group. If two or more individuals are part of a group, the group may have desired seat grouping to allow partners, groups, families, or other groupings to have their seats arranged near one another.

Executable code 240 may include one or more software modules for execution by processor 220. As shown in FIG. 2, executable code 230 includes position module 241, occupancy module 243, and arrangement module 245. Position module 241 is a software module stored in memory 230 for execution by processor 220 to detect and/or determine the location, position, and/or motion of one or more individuals in an area. In some implementations, the area may be an area corresponding to area map 235. The transportation vehicle may be a plane, train, or automobile, etc. In other implementations, the area may be a seating area such as a seating area in an arena or auditorium. In another implementation, the area may be an outdoor seating area, such as an amphitheater, racetrack, sports stadium, etc. Position module 241 may receive input from detection device 205. Position module 241 may access area map 235 and determine a position of one or more individuals in the area based on the input from detection device 205.

Occupancy module 243 is a software module stored in memory 230 for execution by processor 220 to determine an occupancy of the seating area. In some implementations, occupancy module 243, in combination with position module 241, may track the current state of occupancy in the seating area. Occupancy module 243 may store information such as an association between an individual and a particular seat, such as a seat to which the individual holds a ticket, boarding pass, etc. Occupancy module 243 may record if each seat associated with an individual is occupied, if one or more seats associated with an individual are not currently occupied, and/or whether another area of the seating area is occupied by one or more of the individuals not in their associated seat, e.g., when an individual is in a restroom.

Arrangement module 245 is a software module stored in memory 230 for execution by processor 220 to arrange seats 202*a*, 202*b*, . . . , 202*n* into various configurations. In some implementations, arrangement module 245 may arrange seats 202*a*, 202*b*, . . . , 202*n* into a configuration based on a position of one or more individuals in the seating area, an occupancy of the plurality of seats in the seating area, and/or one or more individual profiles 237.

Figure 3:
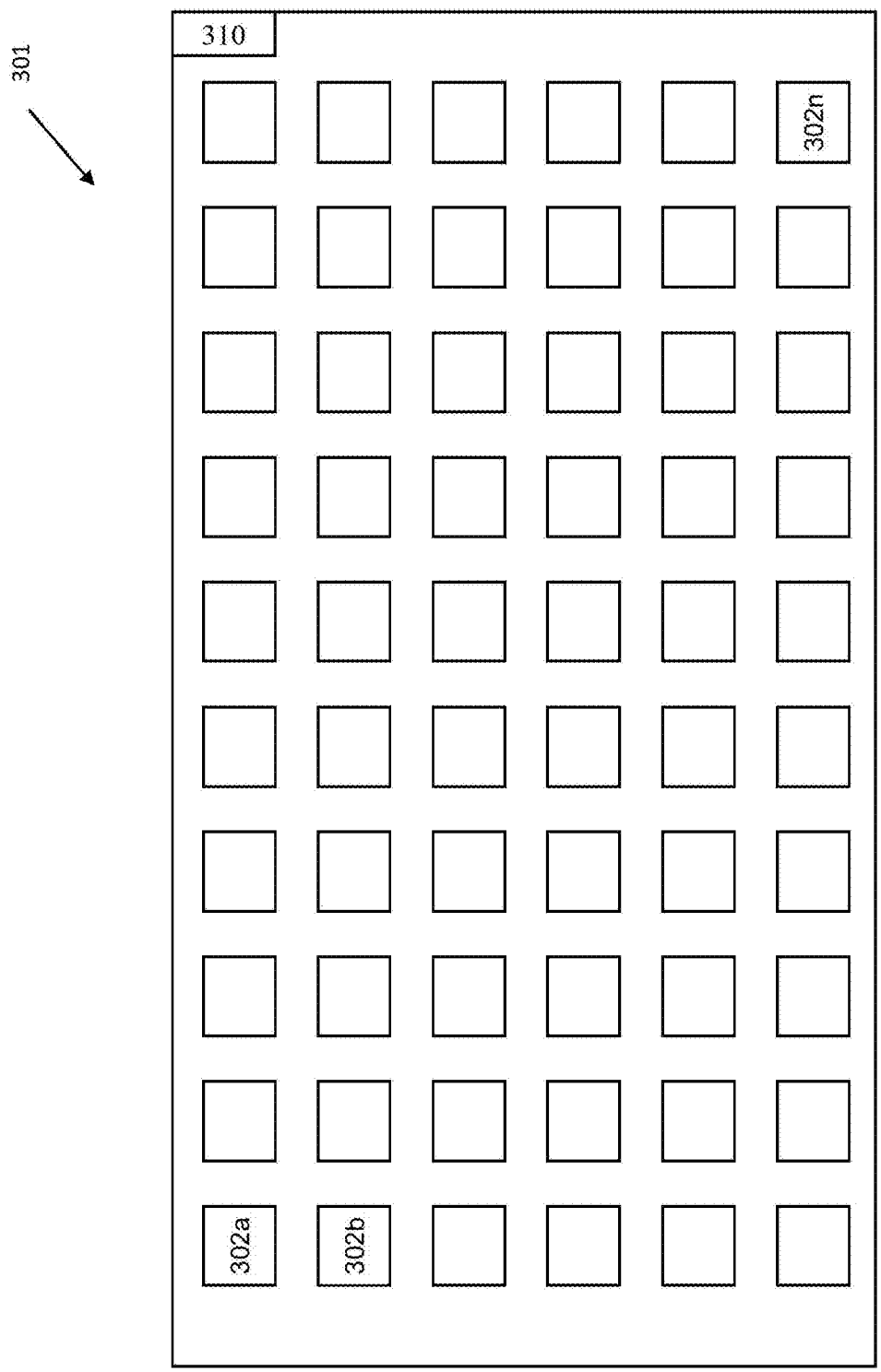
FIG. 3 shows a diagram of an exemplary seating area using the system of FIG. 1, according to one implementation of the present disclosure.

FIG. 3 shows an exemplary diagram of a seating area 301 in which seat 302*a*, seat 302*b*, . . . , 302*n* are each occupied. Accordingly, system 200 has arranged the seats to maximize use of the physical area of seating area 301. The physical area of seating area 301 may be maximized by evenly arranging the plurality of seats 302*a*-302*n* such that each seat has an equal amount of empty space surrounding the seat. In some implementations, when use of the physical space of seating area 301 is maximized, there is no unoccupied aisle through seating area 301. Under the condition in which the seating area is uniformly occupied and system 200 is configured to provide equivalent spacing to each seat 302*a*, seat 302*b*, . . . , 302*n* in seating area 301.

Figure 4:
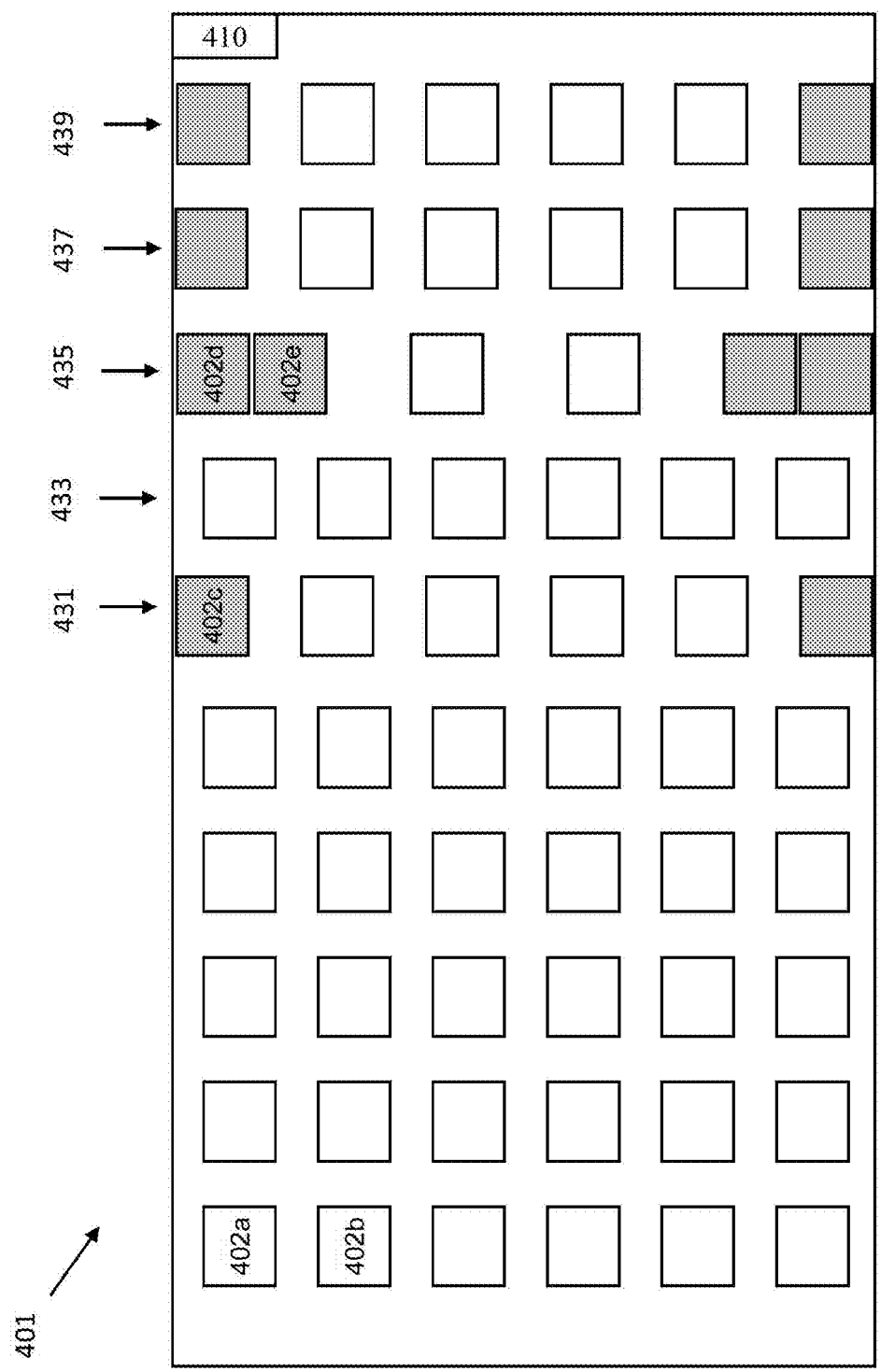
FIG. 4 shows a diagram of an exemplary system for arranging seats in a seating area, according to one implementation of the present disclosure.

FIG. 4 shows an exemplary diagram of seating area 401 in which a plurality of seats 402*a*, 402*b*, . . . , 402*n* are occupied. Seats that are occupied are represented as unshaded seats, such as seat 402*a* and 402*b*. Seats in seating area 401 that are unoccupied are indicated by shaded seats, such as seat 402*c*, seat 402*d*, and seat 402*e*. As shown in FIG. 4, when one or more seats in seating area 401 are unoccupied, the seats may be arranged to maximize the space allocated to occupied seats, and minimize space allocated to unoccupied seats. Although rows 431, 435, 437, and 439 are symmetrically occupied, when a row is asymmetrically occupied, computing device 410 may maximize the physical area of seating area 401 allocated to each occupied seat and minimize the area allocated to each unoccupied seat.

In other implementations, seats may be paired together in groups including two or more seats, such that a group of seats may remain in closer proximity to one another, e.g., to allow companions to sit closer together for conversations, etc. In one implementation, computing device 410 may group two or more seats together. For example, a parent travelling with one or more children may want to sit as a family, with the seats of the one or more children arranged to remain near the seat of the parent. In such a situation, computing device 410 may maintain a grouping of the two or more seats and maximize the area allocated to the group, and to one or more seats near and/or around the group of seats.

Figure 5:
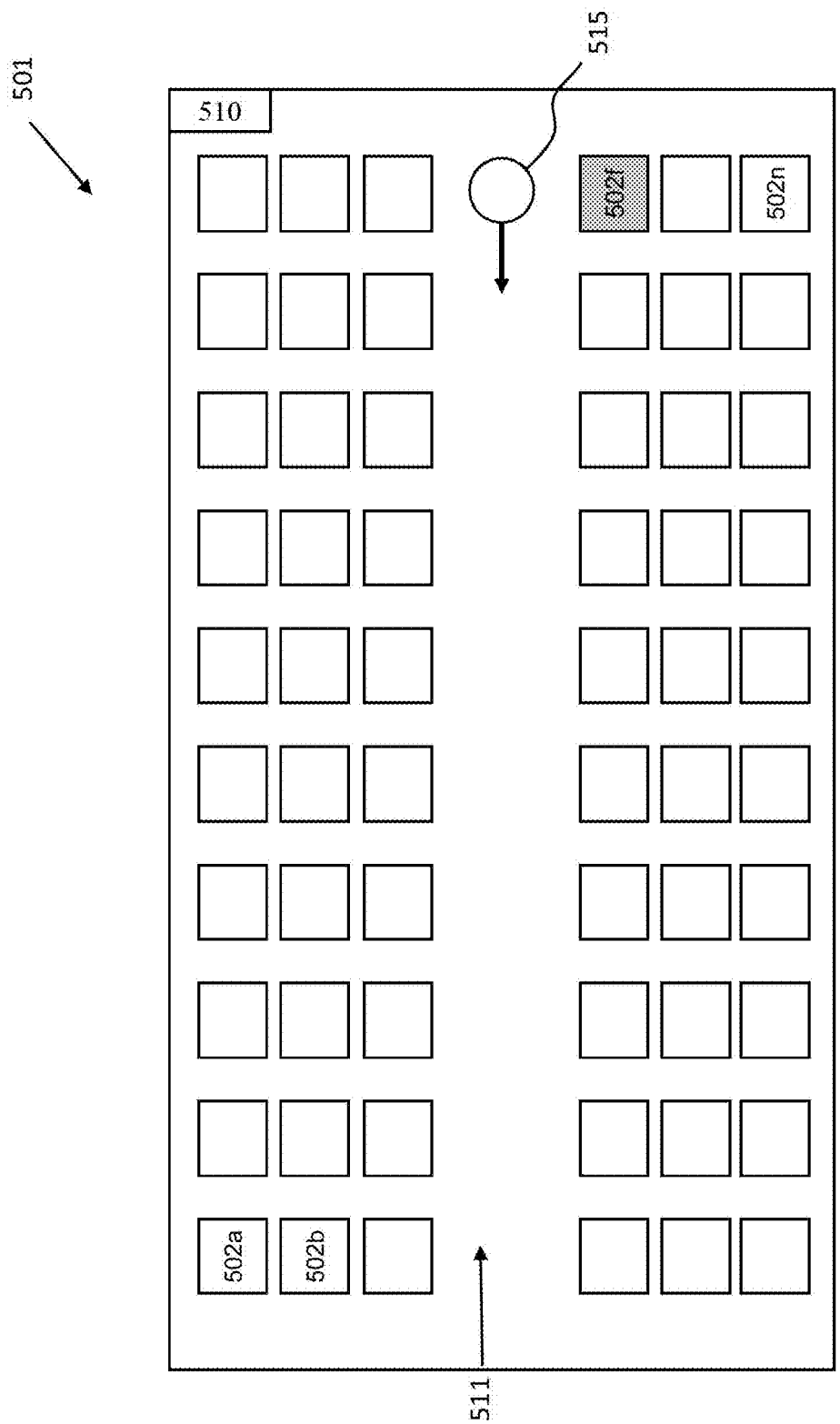
FIG. 5 shows a diagram of an exemplary system for arranging seats in a seating area, according to one implementation of the present disclosure.

FIG. 5 shows a diagram of seating area 501 in which individual 515 of seat 502f has left seat 502f. To enable passage of individual 515 through seating area 501, the system may rearrange seats 502a, 502b, . . . , 502n to create aisle 511. In some implementations, when individual 515 has passed through seating area 501, the system may rearrange seats 502a, 502b, . . . , 502n to eliminate aisle 511 until individual 515 passes back through seating area 501 to return to seat 502f.

Figure 6C:
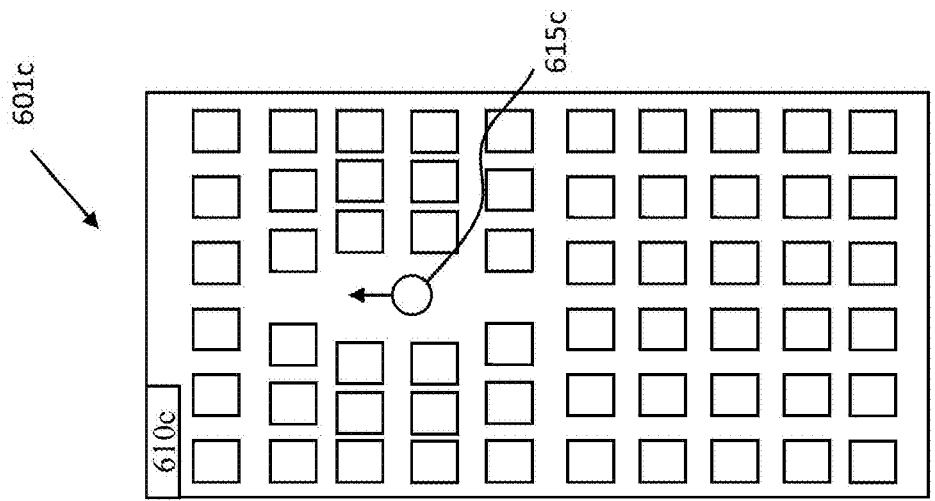
FIGS. 6a, 6b, and 6c show a sequence depicting an individual moving through the exemplary seating area of FIG. 3, according to one implementation of the present disclosure.
Figure 6B:
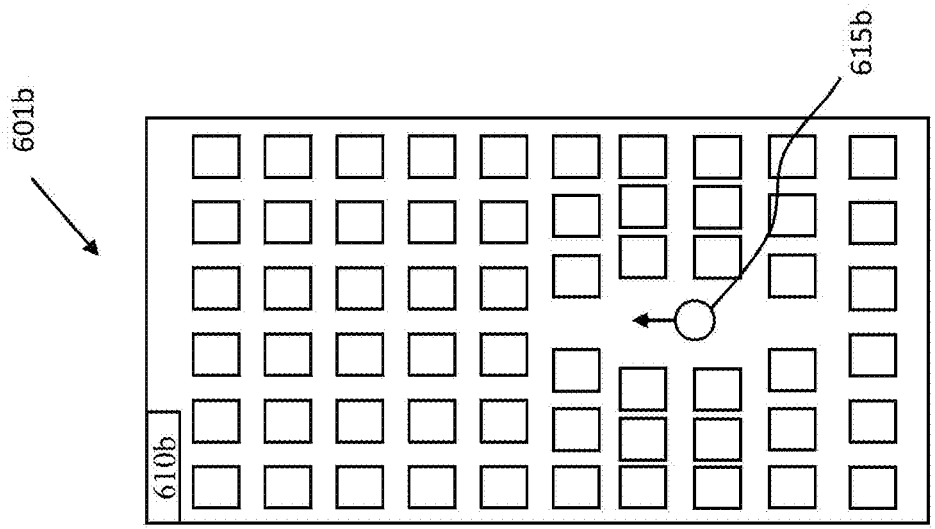
Figure 6A:
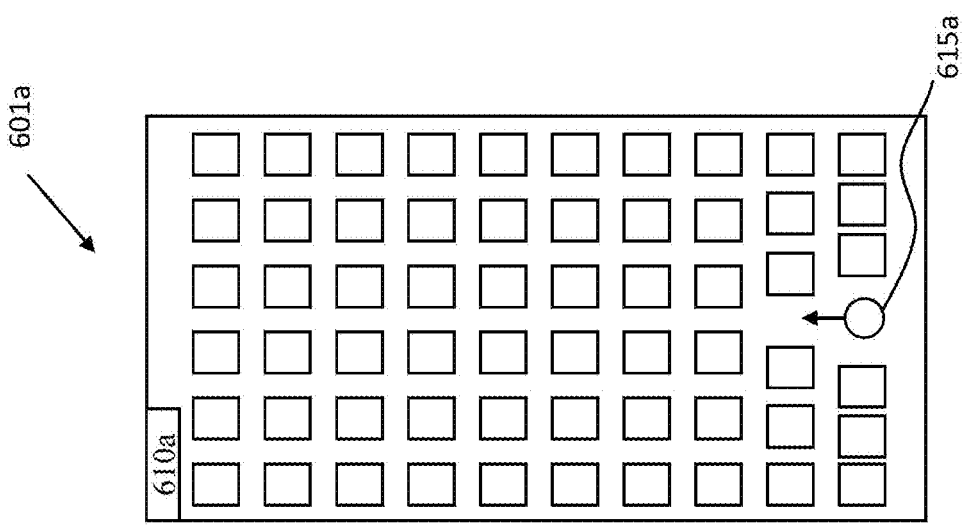

FIGS. 6a, 6b, and 6c show a progression of individual 615 moving through passenger cabin 601 and the seating arrangement corresponding to the position of individual 615 represented by each of FIG. 6a, FIG. 6b, and FIG. 6c. As depicted in FIG. 6a, seating a plurality of seats in seating area 601 may rearrange when individual 615 begins to move through seating area 601. In some implementations, individual 615 may leave a seat in seating area 601, or individual 615 may enter seating area 601 and the plurality of seats 602a, 602b, . . . , 602n may remain fully occupied. As individual 615 begins to move through seating area 601, some of the seats are rearranged to make way for individual 615 to pass.

In some implementations, a passenger may scan an identification, such as a boarding pass, prior to entering the seating area. Such scanning may allow the movable seats in the seating area to be arranged in a way to maximize efficiency in the seating process, i.e., when passengers are entering an airplane. The identification may include a seat indicator identifying the seat assigned to the passenger, and the plurality of seats in the seating area may rearrange to allow the individual to efficiently pass through the seating area and arrive at the seat assigned to the individual FIG. 6b shows passenger cabin 601 as individual 615 moves through. The plurality of seats 602a, 602b, . . . , 602n rearrange to make room for individual 615 to pass, and then return to an arrangement maximizing space allocated occupied seats 602a, 602b, . . . , 602n. FIG. 6c shows the arrangement of seats 602a, 602b, . . . , 602n as individual 615 continues to pass through seating area 601.

Figure 7:
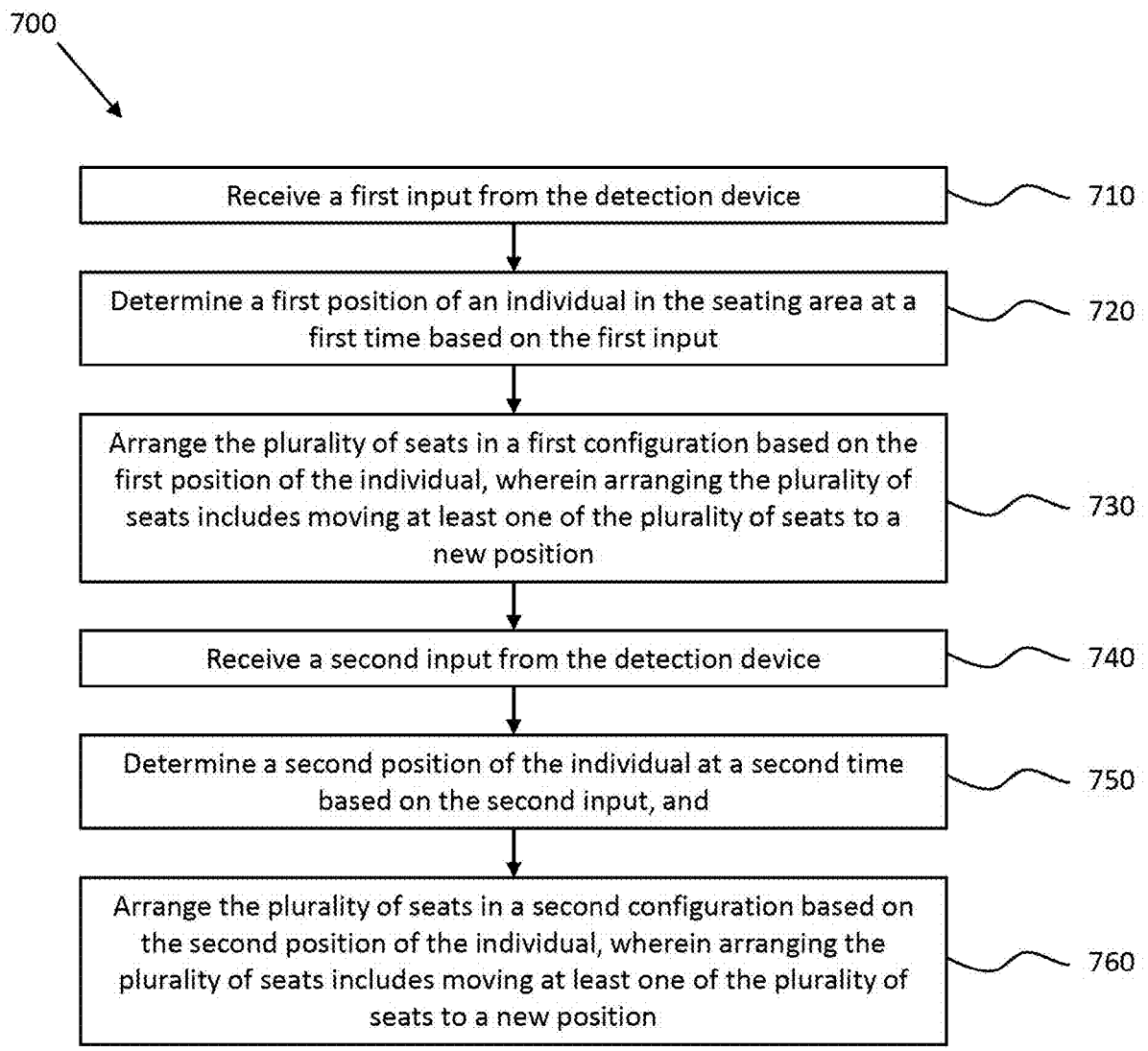
FIG. 7 illustrates an exemplary flowchart of a method for arranging seats in a seating area, according to one implementation of the present disclosure.

FIG. 7 illustrates exemplary flowchart 700 of a method for arranging seats in a seating area, according to one implementation of the present disclosure. Beginning at 710, computing device 210 receives a first input from detection device 205. In some implementations, detection device 205 may transmit a signal to computing device 210 when detection device 205 receives a detection signal indicating that an individual is present in the seating area. Detection device 205 may receive a detection signal in response to transmitting a test signal into the seating area to search for the presence of an individual. Detecting an individual in the seating area may include detection device 205 transmitting and receiving the detection signal.

In some implementations, system 200 may use technology, such as infrared (IR) technology, passive radio frequency identification (RFID) technology, etc. System 200 may transmit an IR signal to detect individuals and/or objects in the seating area and receive a detection signal when an individual is present. The detection signal may be the reflection of the transmitted IR signal, reflected off of the individual in the seating area.

For example, when system 200 transmits an IR signal into the seating area, system 200 may receive a response signal when the infrared signal is reflected back to system 200. Detection device 205 may include an IR transmitter and an IR receiver. Detection device 205 may transmit an IR signal and receive a reflection of the transmitted signal that is reflected off one or more objects in the area. In response to receiving a detection signal, detection device 205 may transmit a signal to computing device 210 indicating the presence of an individual in the seating area.

When system 200 uses an RFID device to detect the presence of an individual in the seating area, each individual may have an RFID tag. In some implementations, each individual may have a ticket associated with a seat, and the ticket may have an embedded RFID tag, such as an active RFID tag or a passive RFID tag uniquely identifying each individual. Detection device 205 may transmit a radio frequency to activate the passive RFID tags. Detection device 205 may receive an RFID tag input signal when an individual carrying a ticket, such as a boarding pass, is present in the seating area. System 200 may analyze the received signal to determine if one or more individuals are present in the seating area.

In some implementations, detection device 205 may use a camera to detect the presence of an individual. A camera may be used to detect the presence of an individual and/or may recognize or identify the individual. For example, a camera may be used to determine that a seat is currently unoccupied or occupied, and if it is occupied, system 200 may use facial recognition software to determine if the seat is occupied by the individual associated with that seat, or may recognize and/or identify the individual. In other implementations, system 200 may detect the presence of an individual using a wireless detection device, such as a wireless transceiver/receiver, installed in some or all of the seats. Each wireless transceiver/receiver may detect the presence of an individual using a received signal. In some implementations, system 200 may determine the proximity of an individual to a seat using a received signal strength indicator (RSSI). By determining the individual's proximity to two or more seats, system 200 may determine a position of the individual in the seating area. In one implementation, each seat of seats 201a, 201b, . . . , 201n, may include a proximity detection system, such as a BLE transceiver/receiver, an ultrasonic transceiver/receiver for transmitting and/or receiving ultrasonic signals. In another implementation, the seating area may include a position detection system, such as switches and/or other detection methods in the floor of the seating area. Each seat 201a, 201b, . . . , 201n, in the area may detect when an individual approaches the seat based on the proximity detection system.

Using area map 235, system 200 may use the position of the individual to determine the individual's location in the seating area. In some implementations, the signal received may be used to detect the proximity of an individual to each seat. As the individual changes distance from each seat, the change in the received signal strength from a wireless transmitter, such as Bluetooth, Bluetooth Low Energy, RF antenna, etc., may indicate the presence of the individual in the seating area. In other implementations, the system may use computer vision to detect the position of one or more individuals in the seating area. In some implementations, detecting the position of an individual may include determining a position based on an area map 235, may include determining the position of the individual relative to one or more other objects, such as seat 202a, seat 202b, . . . seat 202n, etc. In one implementation, detecting the position of an individual may include determining the position of the individual using relative positioning, i.e., triangulation.

At 720, computing device 210 determines a first position of an individual in the seating area at a first time based on the first input. In some implementations, position module 241 may determine a position of one or more individuals in the seating area based on the input signal received from detection device 205. Position module 241 may use the input signal to determine a position of an individual in the seating area using computer vision, triangulation, a combination of the input signal area map 235 to determine a position of an individual in the seating area.

In other implementations, system 200 may determine a position of the individual base on input from the individual. For example, detection device 205 may include an operable button mounted on one or more of seats 202a, 202b, . . . , 202n. As the individual moves through the seating area, the individual may operate one or more of the buttons. When the individual operates the button on a seat, a signal may be transmitted to processor 220. System 200 may determine the position of the individual based on the seat corresponding to the operated button. As the individual moves through the seating area, the individual may operate buttons on subsequent seats, allowing system 200 to determine the motion of the individual through the seating area based on the operation of the buttons. In some implementations, operable switches may be other types of switches, such as reed switches, capacitance switches, or other switches installed in the seating area to detect the presence of an individual. The location of the switches may allow position module 241 to determine the position of the individual.

In another implementation, a monitor may watch the seating area and manually indicate the position and/or location of an individual moving through the area. The monitor may be an individual. The monitor may manually enter position and/or location information of the individual moving in the seating area. System 200 may rearrange one or more of seats 201a, 201b, . . . , 201n based on the input of the monitor.

At 730, computing device 210 arranges the plurality of seats in a first configuration based on the first position of the individual, wherein arranging the plurality of seats includes moving at least one of the plurality of seats to a new position. In some implementations, system 200 may move one or more of seats 202a, 202b, . . . , 202n, from an initial position to a new position, arranging the plurality of seats into a new configuration. The new configuration may be based on the position of the individual in the seating area, the motion of the individual in the seating area, one or more preferences associated with the individual stored in individual profiles 237, etc. In some implementations, the new configuration maximizes the area available to each occupied seat in the seating area and creates an aisle or aisle segment for the individual to pass through. In some implementations, system 200 may rearrange the seats to create a plurality of paths or path segments through which a corresponding plurality of individuals may pass.

In some implementations, as the individual moves through the seating area, system 200 may move one or more of the plurality of seats to clear one or more paths through which the individual may pass. Rearranging the seats may include moving one or more seats in the seating area. In some implementations, the seats may be moved in one dimension, two dimensions, or three dimensions. In some implementations, arrangement and/or rearrangement of the seats may include motion in one dimension, e.g., across the width of the passenger cabin, along the length of the passenger cabin, or in the height of the passenger cabin. Rearranging the seats may include movement in two dimensions, e.g., adjusting the position of one or more seats across the width of the passenger cabin and along the length of the passenger cabin.

In some implementations, the seats may be on tracks, such as tracks across the width of the passenger cabin of a bus, train, plane, etc., substantially perpendicular to the length of the seating area and/or substantially along the length of the seating area. In some implementations, each seat of the plurality of seats may be movable across the width of the seating area, forward and backward in the seating area, and/or up and down within the height of the searing area. The seats may be repositioned using one or more motors on each seat, by moving the seats with cables in the tracks attached to each of the seats, etc. In other implementations, the plurality of seats may each have wheels enabling the seats to move about the seating area in two dimensions. In other implementations, the plurality of seats may be held in place and/or moved using magnets, i.e., along magnetic tracks or across a magnetic panel in the floor. The seats may be held in position and arrangeable using various combinations of gears, wheels, tracks, ropes, cables, etc.

System 200 may arrange the plurality of seats in the seating area to facilitate efficiency in loading and unloading individuals in the seating area, such as when boarding or deplaning an aircraft such as a passenger airplane. In such an implementation, computing device 210 may receive an input signal from a boarding system, such as when a passenger's boarding pass is scanned at the boarding gate. To allow passengers to efficiently board the plane, system 200 may arrange the seats to permit passengers direct access to their seats, rearrange the plurality of seats to open a new aisle bypassing a congested area, etc. In some implementations, the plurality of seats may be arranged to facilitate proper weight distribution, such as distributing the weight effectively on an airplane. For example, in a plane with very few occupied seats, the unoccupied seats may be arranged in one or more groups with even weight distribution.

In some implementations, when system 200 detects an individual moving in the area, system 200 may reposition the plurality of seats to create a path, such as an aisle, to allow the individual to walk or move through the seating area. In other implementations, the plurality of seats in the seating area may be sequentially repositioned as the individual moves through the area, dynamically maximizing the amount of space allocated to each individual in the area and minimizing unused space in the seating area. In some implementations, system 200 may include a plurality of hardware processors, such as an implementation in which a plurality of the seats include a corresponding plurality of processors and sensors for determining a position of the seat and rearranging each seat based on the position of each seat relative to one or more other seats, one or more other objects in the seating area, such as a wall, and/or one or more individuals in the seating area.

System 200 may be configured to maintain at least a certain minimum distance between each seat and one or more individuals in the seating area when the one or more individuals are moving through the seating area. In some implementations, the minimum distance may be limited based on the size of the area, the relative proximities of the plurality of seats in the area, and/or a preference of each individual stored in individual profiles 247. System 200 may be configured to maximize the use of space in the area based on the positions of one or more individuals in the area. For example, when one or more individuals are seated in a corresponding one or more seats in the area, the system may position the plurality of seats to maximize the space available to individuals seated in the seats, and minimize space between unoccupied seats.

In some implementations, system 200 may maximize the space allocated to occupied seats and minimize unused space where unused space may include empty seats. For example, the seats in a passenger cabin having ten rows of six seats each, the six seats in each row may be evenly distributed across the width of the passenger cabin to maximize the space for each seat and minimize the unused space in the passenger cabin. If an individual stands up from the seat in which the individual was seated and begins to move, for example, from the front of the passenger cabin towards a restroom located at the back of the passenger cabin, it may be necessary to reposition some or all of the seats in the area as the individual moves through the seating area. In some implementations, the seats in the ten rows may be distributed through the length of the passenger cabin to maximize the space allocated to each seat, such as to maximize leg room given to occupied seats in the seating area.

At 740, computing device 210 receives a second input from detection device 205. Method 700 continues at 750, where computing device 210 determines a second position of an individual in the seating area at a first time based on the second input. At 760, computing device 210 arranges the plurality of seats in a second configuration based on the second position of the individual, wherein arranging the plurality of seats includes moving at least one of the plurality of seats to a new position. In some implementations, the second configuration may be a different configuration than the first configuration. In some implementations, the second time and the second arrangement may closely follow the first time and the first arrangement so that the seats in the seating area are dynamically arranged to allow an individual to continuously move through the seating area without being impeded by having to wait for the seats to move.

In some implementations, method 700 may include determining a motion of an individual in the seating area. The system may sample the position of one or more individuals in the seating area. In some implementations, the system may sample the positions of one or more individuals at 20 hertz, 10 hertz, 5 hertz, etc. Based on the sampling, the system may determine that one or more of the individuals is moving in the seating area. In other implementations, the system may use computer vision to track the motion of the one or more individuals in the seating area. In another implementation, the system may identify the individuals within each seat, so information such as loyalty points may be associated with a seat assignment and the movable seats may auto-configure to give preferential space allotment based on loyalty points, etc. Such a configuration may be used to locate luxury seating throughout the cabin instead of sequestering first class to only the front portion of the plane. In some implementations, the cabin may auto-reconfigure based on the spacing needs of the individuals actually travelling.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a plurality of movable seats in a seating area;
   a detection device;
   a non-transitory memory storing an executable code;
   a hardware processor executing the executable code to:
      receive a first input from the detection device indicating an individual is present in the seating area;
      determine a first position of the individual in the seating area at a first time based on the first input;
      receive a second input from the detection device;
      determine a second position of the individual in the seating area at a second time based on the second input;
      determine a motion of the individual moving through the seating area based on the first position and the second position; and
      dynamically rearrange the seats in the seating area by moving at least one of the plurality of seats to a new position based on the motion of the individual moving through the seating area.

2. The system of claim 1, wherein the non-transitory memory further includes a first individual profile, and wherein a first configuration of the seats in the seating area is based on a preference included in the first individual profile.

3. The system of claim 1, wherein a first seat of the plurality of movable seats is associated with the individual.

4. The system of claim 1, wherein the detection device is one of a camera, a wireless receiver, a passive detection mechanism, a LIDAR receiver, and an operable button.

5. The system of claim 1, wherein the first configuration maximizes an area available to each of a plurality of occupied seats in the seating area and creates an aisle segment for the individual to pass through.

6. The system of claim 1, wherein the system further includes an identification marker for identifying the individual.

7. The system of claim 6, wherein the identification marker is a wireless transmitter.

8. A method for arranging seats in a seating area using a system including a non-transitory memory and a hardware processor, the method comprising:
   receiving a first input from a detection device indicating an individual is present in the seating area;
   determining, using the hardware processor, a first position of the individual in the seating area at a first time based on the first input;
   receiving a second input from the detection device;
   determining, using the hardware processor, a second position of the individual in the seating area at a second time based on the second input;
   determining, using the hardware processor, a motion of the individual moving through the seating area based on the first position and the second position;
   dynamically rearranging the seats in the seating area by moving at least one of the plurality of seats to a new position based on the motion of the individual moving through the seating area.

9. The method of claim 8, wherein the non-transitory memory stores a first individual profile, and a first configuration of the seats in the seating area is based on a preference included in the first individual profile.

10. The method of claim 8, wherein a first seat of the plurality of movable seats is associated with the individual.

11. The method of claim 8, wherein the detection device is one of a camera, a wireless receiver, a passive detection mechanism, a LIDAR receiver, and an operable button.

12. The method of claim 8, wherein the first configuration maximizes an area available to each of a plurality of occupied seats in the seating area and creates an aisle segment for the individual to pass through.

13. The method of claim 8, wherein the system further includes an identification marker for identifying the individual.

14. The method of claim 13, wherein the identification marker is a wireless transmitter.

\* \* \* \* \*